(12) United States Patent
Buchanan et al.

(10) Patent No.: US 6,594,044 B1
(45) Date of Patent: Jul. 15, 2003

(54) APPARATUS AND METHOD FOR AUTOMATIC PORT IDENTITY DISCOVERY IN HETEROGENOUS OPTICAL COMMUNICATIONS SYSTEMS

(75) Inventors: William M. Buchanan, Hampstead, NH (US); Yang Cao, Bradford, MA (US); Steven A. Surek, Leonardo, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/526,194

(22) Filed: Mar. 15, 2000

(51) Int. Cl.$^7$ .......................... H04B 10/08; H04B 10/20
(52) U.S. Cl. ....................................... 359/118; 359/110
(58) Field of Search ................................ 359/110, 118, 359/155, 167; 370/241, 244, 250, 259, 258

(56) References Cited

U.S. PATENT DOCUMENTS 5,774,245 A * 6/1998 Baker .......................... 359/128
6,115,361 A * 9/2000 Fredericks et al. ......... 370/242
6,205,145 B1 * 3/2001 Yamazaki ................. 370/395.65

* cited by examiner

*Primary Examiner*—Leslie Pascal
*Assistant Examiner*—Dalzid Singh

(57) ABSTRACT

In an optical telecommunications network in accordance with the principles of the present invention, a link connection undergoes an automatic port recognition process, whereby the port binding information for the link is detected, recorded and shared with the network elements connected by the link, before the link is used to transmit bearer traffic. One of a group of optical network elements that communicate through an out of band channel, such as a LAN, is "elected" a network element leader. After election, the leader network element coordinates the port discovery process; requests for port "recognition", responses to requests, and other messages are passed through the network element leader on the out of band channel from one non-leader network element to another. Once the recognition process is set up through the leader network element, an optical test signal is transmitted along the link in question from the recognition requesting network element to all other network element s in the network. The receiving network elements monitor the power level at each of their "inactive" ports and the inactive port at which an increased energy level is detected is determined to be the port attached to the link in question.

27 Claims, 7 Drawing Sheets

| WAVELENGTH LINK ID | LINK RECOGNITION STATUS | LINK WORKING STATUS |
|---|---|---|
| UNIQUE INTEGER ID TO DIFFERENTIATE EACH WAVELENGTH LINK ON ONE OPTICAL SWITCHING SYSTEM | 0: NOT RECOGNIZED YET<br>1: RECOGNIZED | 0: NO TRANSMISSION YET<br>1: DURING THE TRANSMISSION |

FIG. 2A

| WAVELENGTH LINK ID | LINK RECOGNITION STATUS | LINK WORKING STATUS |
|---|---|---|
|  | 0 | 0 |
|  | 1 | 0 |
|  | 1 | 1 |

FIG. 2B

APPARATUS AND METHOD FOR AUTOMATIC PORT IDENTITY DISCOVERY IN HETEROGENOUS OPTICAL COMMUNICATIONS SYSTEMS

FIELD OF THE INVENTION

The invention relates to the determination of port identities in a telecommunications system and, in particular to the automatic determination of port identities in a heterogenous telecommunications system.

BACKGROUND OF THE INVENTION

In 1876, inside a third floor walk-up garret apartment in the Scollay Square section of Boston Mass., Alexander Graham Bell spoke the first sentence transmitted over telephone wires. Technical innovations have dramatically transformed the telecommunications industry over the past one hundred and twenty three years. For example, telecommunications switching systems have evolved considerably from "hand operated" systems in which one instrument was electrically connected (through a hierarchical switching network) to another through the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS), in which the instruments are automatically connected through the network by electronic systems.

Additionally, in many cases, the signalling system employs optical signalling instead of, or in addition to, electronic signalling. Switching systems that employ both optical and electronic signals are incapable of the achieving the operational speeds that an all-optical system might attain. That is, systems exist which, although they employ optical signals for data transmission, convert the optical signals to electronic signals for switching purposes, then convert the switched electronic signals back to optical signals for further transmission. One of the difficulties associated with all-optical telecommunications systems is the discovery of port binding information. That is, an optical network element (NE) such as an all-optical switch, may not be aware of the port to port connectivity between itself and other optical NEs within a telecommunications system. It would be highly desirable if this port-to-port connectivity information, or port binding information, could be automatically discovered without requiring the conversion of optical signalling to electronic signalling.

SUMMARY

In an optical telecommunications network in accordance with the principles of the present invention, a link connection undergoes an automatic port recognition process, whereby the port binding information for the link is detected, recorded and shared with the network elements connected by the link, before the link is used to transmit bearer traffic. One of a group of optical network elements that communicate through an out of band channel, such as a LAN, is "elected" an NE leader. After election, the leader NE coordinates the port discovery process; requests for port "recognition", responses to requests, and other messages are passed through the NE leader on the out of band channel from one non-leader NE to another. Once the recognition process is set up through the leader NE, an optical test signal is transmitted along the link in question from the recognition requesting NE to all other NEs in the network. The optical test signal could be light of a frequency set aside for test purposes, or it may be light commonly used for data communication. In the context of the test the presence of any optical signal may be interpreted as the test signal. The receiving NEs monitor the power level at each of their "inactive" ports and the inactive port at which an increased energy level is detected is determined to be the port attached to the link in question. One advantage of using an optical signal and measuring received power at receiving ports in accordance with the principles of the present invention is that there is no need for converting optical signals to electrical signals, then interpreting the electrical signals. Thus, the operational speed of an NE may be maintained and the complexity and concomitant costs associated with port discovery may be minimized.

Each optical network element within the system includes a link status table and a recognition request queue. An NE employs the link status table to determine which of its ports have been "recognized", that is, which links have had their port binding information discovered. The NE performs the link recognition process on those links that have not been recognized. The NE leader places received recognition requests in a request queue and processes those requests as they make their way to the front of the queue. If the queue is a first in first out queue (FIFO queue), the requests are processed in the order in which they are received, but other prioritization schemes are possible. Through the link status table, each optical NE, such as an optical switching system, can select the link connections having a link recognition status indicating that the link is "unrecognized", then perform the recognition process for the related link connections.

BRIEF DESCRIPTION OF THE DRAWINGS

The above and further features, aspects, and advantages of the invention will be apparent to those skilled in the art from the following detailed description, taken together with the accompanying drawings in which:

FIGS. 2A and 2B are tables that respectively illustrate the contents of a link status table, and the allowable combinations of link statuses;

DETAILED DESCRIPTION

In an optical telecommunications network in accordance with the principles of the present invention, a link connection undergoes an automatic port recognition process, whereby the port binding information for the link is detected, recorded and shared with the network elements connected by the link, before the link is used to transmit bearer traffic. One of a group of optical network elements which communicate through an out of band channel, such as a LAN, is "elected" an NE leader. After election, the leader NE coordinates the port discovery process; requests for port "recognition", responses to requests, and other messages are passed through the NE leader on the out of band channel from one non-leader NE to another. Once the recognition process is set up through the leader NE, an optical test optical signal is transmitted along the link in question from the recognition requesting NE to the receiving NE. The optical test signal could be light of a frequency specifically designated for test purposes, or it may be light commonly used for data communication. In the context of the test, the presence of any optical signal may be interpreted as the test signal and a measure of optical received power may be employed as the test indicator. The receiving NEs monitor the power level at their "inactive" ports and the inactive port at which an increased energy level is detected is determined to be the port attached to the link in question.

Figure 1:
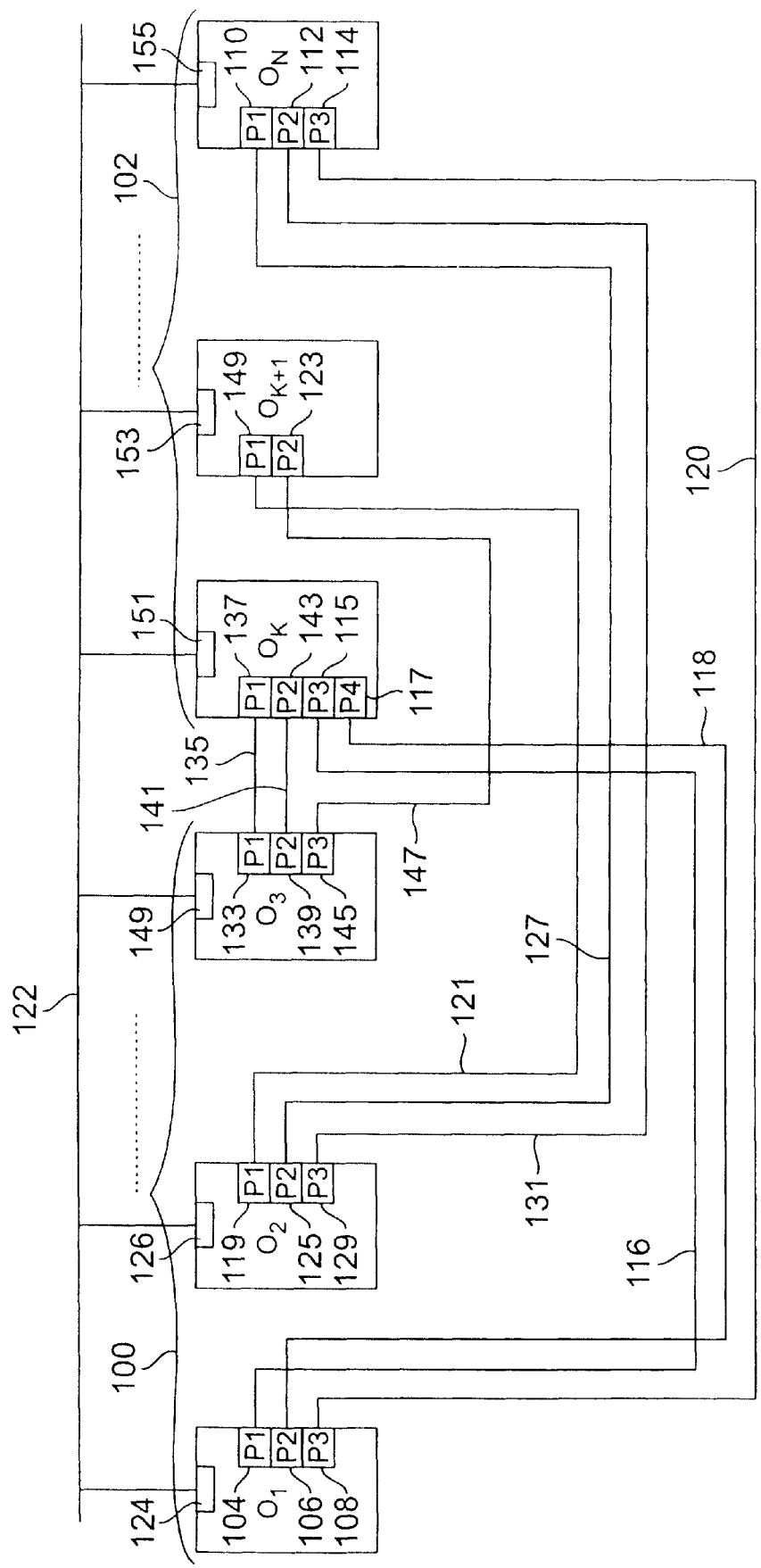
FIG. 1 is a conceptual block diagram of a muti-network-element optical telecommunications system in accordance with the principles of the present invention.

As illustrated in the conceptual block diagram of FIG. 1, an optical telecommunications system in accordance with the principles of the present invention includes a plurality of optical network elements $O_1$, $O_2$, $O_3$, $O_k$, $O_{k+1}$, and $O_N$. Each of the network elements is connected to other network elements through ports, such as port 104 (P1), port 106 (P2), and port 108 (P3) of the optical network element $O_1$ and port 110 (P1), port 112 (P2), and port 14 (P3) of the optical network element Ok+1.

In the illustrative conceptual block diagram of FIG. 1, port P1 104 of NE $O_1$ is connected through a link 116 to port P3 115 of NE $O_{k+1}$, port P2 106 of NE $O_1$ is connected through a link 118 to port P4 117 of NE $O_{k+1}$, and port P3 108 of NE $O_1$ is connected through a link 120 to port P3 114 of NE $O_N$. Similarly, port P1 119 of NE $O_2$ is connected through a link 121 to port P2 123 of NE $O_{k+1}$, port P2 125 of NE $O_2$ is connected through a link 127 to port P1 110 of NE $O_N$, port P3 129 of NE $O_2$ is connected through a link 131 to port P2 112 of NE $O_N$. Finally, port P1 133 of NE $O_k$ is connected through a link 135 to port P1 137 of NE $O_{k+1}$, port P2 139 of NE $O_k$ is connected through a link 141 to port P2 143 of NE $O_{k+1}$, and port P3 145 of NE $O_k$ is connected through a link 147 to port P1 149 of NE $O_{k+1}$. Each of the links 116, 118, 120, 121, 127, 131 and 147 employs a SONET/SDH transport level and in addition to the data they carry, overhead, control, information is sent through these optical links.

Although it may be possible to use the control information carried in these links to determine the port interconnectivity of the optical network elements O1, O2, O3, $O_k$, $O_{k\ 1}$, and $O_N$, the cost associated with such an undertaking would be burdensome in both fiscal and performance terms. Nevertheless, this port interconnectivity information is required for some applications and manual discovery and recordation of this interconnectivity information also has significant drawbacks. In accordance with the principles of the present invention, an "out of band" communications channel, such as that formed by the link 122 and interfaces 124, 126, 149, 151, 153, and 155 respectively located within NEs $O_1$, $O_2$, $O_3$, $O_K$, $O_{K+1}$, and $O_N$, is employed to automatically discover port interconnection information. This out of band channel may take the form of a local area network (LAN) which connects a group of NEs and which provides a path for management and control of the NEs thus connected.

Each optical network element within the system includes a link status table, as illustrated in the table of FIGS. 2A and 2B. An NE employs the link status table to determine which of its ports have been "recognized", that is, which links have had their port binding information discovered. The NE performs the link recognition process on those links that have not been recognized. Table 2A enumerates the allowable combinations of link recognition status and link working status. In accordance with the principles of the present invention, a link will only handle bearer traffic if it has been recognized; this is reflected in the fact that a combination of link recognition status "0" and link working status "1" is not permitted. The optical signal employed by the invention to create a change in power level received at an unrecognized port, and thereby uncover port binding information, may be sent directly from a the port attached to the other end of the link or it may be switched into that port from another source, such as a test signal source which may reside within the NE. The optical switching system, NE, measures received power at each port having a link connection recognition status and a link transmission status equal to "0". In this way, power measurements for the recognition process will be confused by the power normally received at a port in the active transmission stage. If power is detected at an unrecognized port, the port may be connected to a digital monitor (e.g. at a test port) that examines the signal to determine whether it is a recognition signal or an alarm signal. The process is automated. If the received signal is a recognition signal, the port binding information is recorded and communicated, as described in greater detail below. Alternatively, each ingress port may be fitted with a tapping device to filter potential automatic identification signals.

After initialization,.each NE plays either a leader role or non-leader role. Each non-leader NE sets up a TCP connection with the virtual leader. The NE leader, or virtual leader, is "elected" as described below. The virtual leader NE sets up TCP connections with all the non-leader NEs on the same out of band channel (referred to as a LAN below). Assuming a total of N optical NEs, the total number of TCP connections needed is 2*(N−1). (If, instead, a point-to-point based connection is employed, N(N−1) connections would be required). Should a non-leader NE fail, either through failure of the NE itself or through a failure of the NE's LAN connection, the NE leader notifies a network management system (not shown) of the failure. If a leader NE fails, through failure of the NE or its connection to the LAN, the leader election process will be repeated and the newly elected leader will notify the network management system of the previous NE's failure.

The new protocol (automatic interconnection recognition protocol, AIRP) may use either a LAN connection or serial link that employs TCP as a transport layer for communications sessions. Port interconnectivity may be discovered between two peers with a single AIRP session and, in order to establish and maintain the port interconnectivity information, an AIRP session should be run each time an NE is initialized or re-booted. As will be described in greater detail below, an NE may initiate the port interconnectivity discovery process by sending a port identification initiation message to a NE to which it is linked In accordance with the principles of the present invention, an NE may, under various circumstances, such as it's initialization, or re-booting, initiate a port interconnectivity discovery process by sending a recognition request message to a NE to which it is bound through a network link. The message first passes through the NE's leader. That is, in accordance with the principles of the present invention, the network elements elect a leader that coordinates the port identification process. The leader associated with the initiating NE queues port recognition requests from its associated NEs and broadcasts the recognition requests from the initiating network element, such as network element $O_1$ to all the network elements other than the initiating network element, through the out of band link 122. The network element leader, NE $O_1$ for example, awaits an acknowledgement signal from the receiving network elements and, once received, passes the acknowledgement signal to the initiating NE which then transmits a test message from a specific port, such as port P1 104 to the receiving network element. The test signal transmitted by the initiating network element is an optical signal and may be light of any frequency, or of a special test frequency, for example.

After sending an acknowledgement message to the initiating network element through the link 122, the other NEs begin polling their ports to detect which port receives the test message, as evidenced by an increase in the optical power level received at that port. Once a receiving network element detects which of its ports receives the test message (e.g., port P3 115 in this illustrative example), the receiving network element records the port binding information and stops polling its own ports. Additionally, the receiving network element $O_{K+1}$ transmits a detection message to the initiating network element $O_1$. This detection message includes the receiving network element's port identity and is transmitted, through the out of band channel 122. Upon receiving the detection message from the receiving network element $O_{K+1}$, the initiating network element $O_1$ stops sending the test message through the SONET/SDH link 118, records the port binding information, and transmits a recognition acknowledgement message to the receiving network element $O_{K+1}$ through the out of band channel 122.

Figure 3:
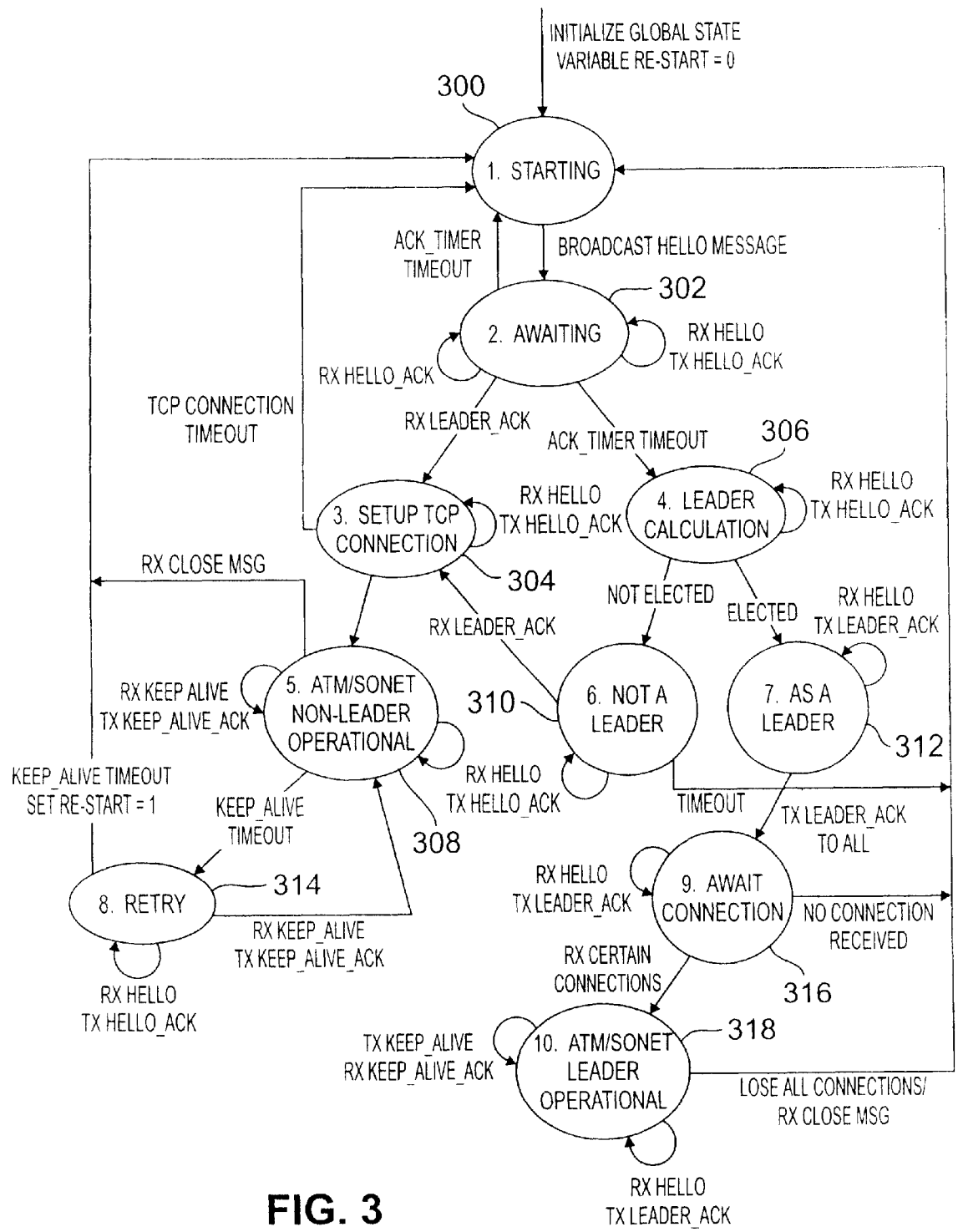
FIG. 3 is a finite state machine diagram of the initialization process of an optical NE in accordance with the principles of the invention.

The AIRP includes six operational messages:

1. AIRP_Recognition_Request message, used to request the corresponding side to participate in interconnection recognition process.
2. AIRP_Recognition_Notification message, used by SONET virtual leader to notify each SONET NE to start polling process.
3. AIRP_Recognition_Grant message, used by ATM virtual leader to grant certain ATM NE's link recognition request.
4. AIRP_Recognition_Detected message, used to inform the requesting side the corresponding inter-connection ID information
5. AIRP_Ack message, used by requesting side as an positive acknowledgement message back to the requested side.
6. AIRP_Nak message, used by requested side to indicate certain negative acknowledgement scenario The state diagram of FIG. 3 illustrates the various states an NE may assume and transitions between those states at the time of initialization. The process begins in step 300, the starting state, in which an NE sends an AIRP_Hello message and starts an acknowledgement timer (ACK_timer). The NE is assumed to be equipped with a group MAC address. From the starting state the process proceeds to step 302, the awaiting state. If the NE receives AIRP_Leader_Ack before the ACK_timer expires, the NE stops the timer and transit to Step 304, the TCP setup state. If the NE receives any AIRP_Hello message, it will return an AIRP_Hello_Ack message. If the NE receives an AIRP_Hello_Ack from other NEs, it will store the information contained in the AIRP_Hello_Ack messages. If the Ack_timer times out before the NE receives an AIRP_Hello_Ack, the NE. stops the timer returns to step 300, the starting state. If the Ack_timer times out, for want of an acknowledgement message from the leader, but the NE receives AIRP_Hello_Ack messages from other Nes, the NE stops the timer and proceeds to step 306, the the leader calculation state. A timeout or the reception of any message other than an AIRP_Hello_Ack. message returns the NE to the starting state 300.

In the TCP setup state 304, the NE sets up a TCP connection with an NE identified as an NE leader. The NE also resets the state variable re-start=0,1 and proceeds to step 308, the non-leader operational state. If the NE can't successfully establish TCP connection with the leader (connection time-out), the NE returns to step 300, the starting state. If the NE receives an AIRP_Hello message, it returns an AIRP_Hello_Ack message.

In the leader calculation state 306, the NE sorts all the MAC address including those received from the other NEs' AIRP_Hello_Ack messages and its own MAC address and "elects" a leader based on the addresses. For example the NE having the highest address may be used as the leader and, if the NE itself has the maximum MAC address, it is assumed elected and proceeds to step 312 where it operates as a leader. Otherwise, the NE proceeds to step 310 where it operates as a non-leader. If the NE receives an AIRP_Hello message, it returns an AIRP_Hello_Ack message.

Figure 4:
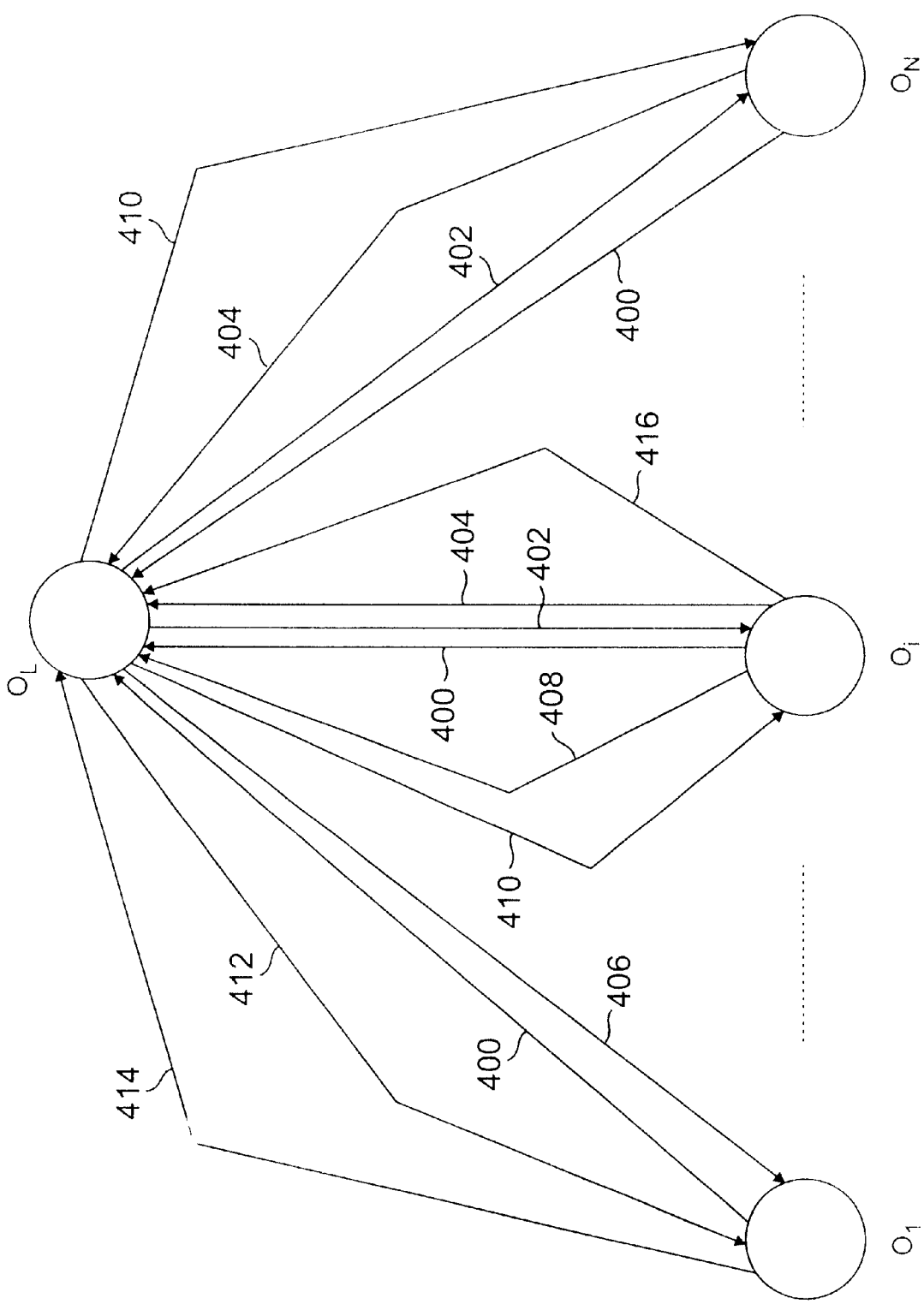
FIG. 4 is a sequence diagram which illustrates a process of automatic discovery of port binding information, such as might be employed with the system of FIG. 1.
Figure 5:
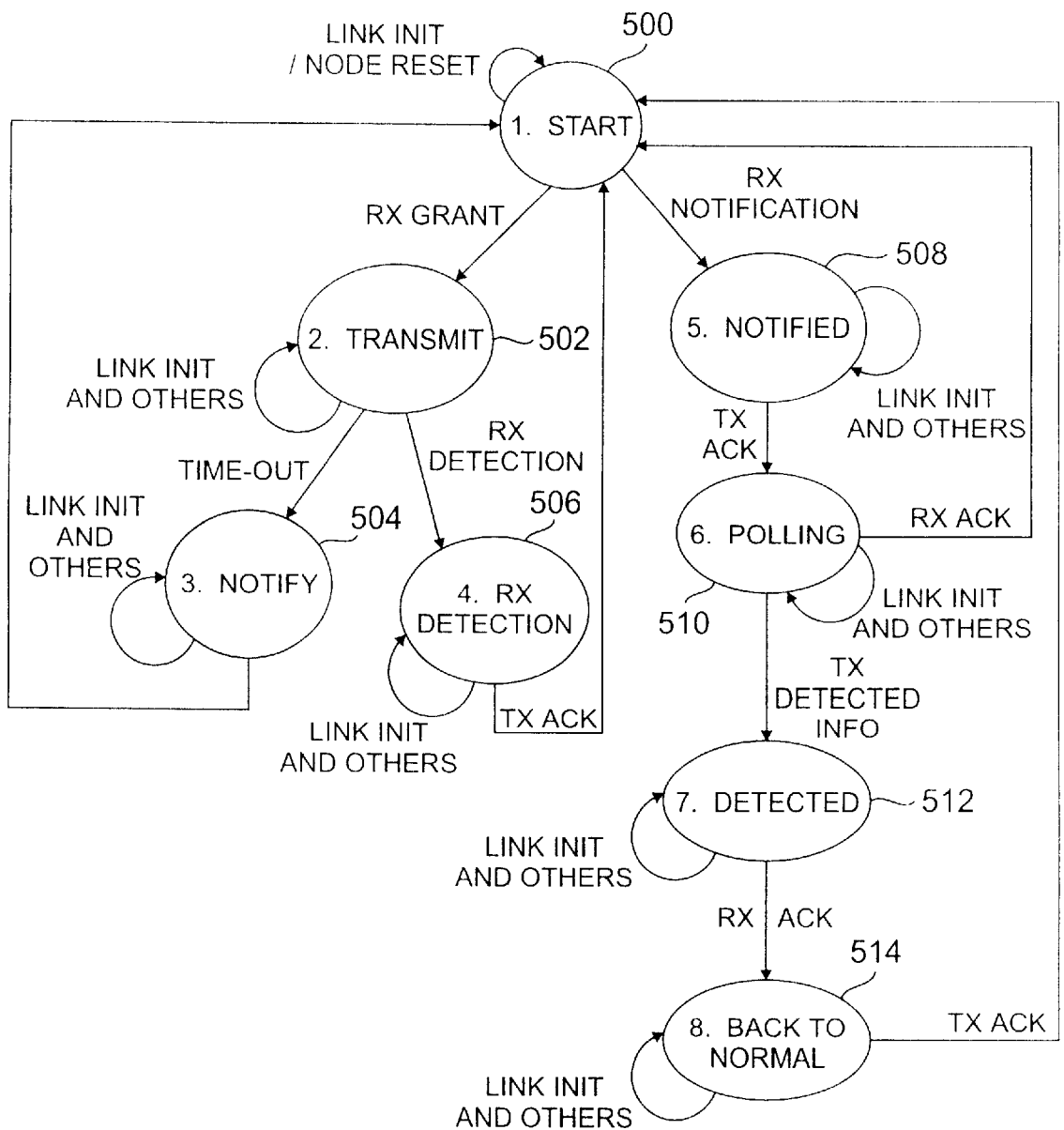
FIG. 5 is a state diagram which illustrates the operation of a non-leader optical NE in accordance with the principles of the present invention.

In step 308, non-leader state, an NE will operate in a non-leader mode as described in greater detail in the discussion related to FIGS. 4 and 5. If an NE receives an AIRP_Hello message, it returns an AIRP_Hello_Ack message. If an Ne receives an AIRP_Close message the NE returns an AIRP_Ack message and returns to step 300, the starting state. If an NE receives an AIRP_Keep_Alive message from the leader before the timer expires the NE returns an AIRP_Keep_Alive_Ack message to the leader. If an NE does not receive an AIRP_Keep_Alive message from the leader within the timer period, the NE re-starts its Keep_alive timer and proceeds to step 314, the retry state. All other operational messages will keep the NE in step 308, the operational state. The operational state is described in greater detail in the discussion related to FIG. 5, which encompasses the non-leader operational state.

In step 310, the "not-a-leader" state, an NE awaits the reception of an AIRP_Leader_Ack message and, if it receives such as message within the period of its acknowledgement timer, the NE records its leader NE's information and proceeds to step 304, the setup TCP state. In step 310, a not a leader state, the NE records a leaders information and proceeds to step 304 if it receives an AIRP_Leader_Ack message within the timer period. If the NE does not receive an AIRP_Leader_Ack message within the timer period, the NE proceeds to step 300, the starting state. If the NE receives an AIRP_Hello message, the NE returns an AIRP_Hello_ack message.

In step 312, the leader state, an NE, which is a virtual leader node, sends an AIRP_Leader_Ack message to all the NEs that have sent a Hello message to the leader node. If the value of the NE's state variable re-start is 1, the NE notifies the network management system of the loss of the previous leader node. Additionally, the NE resets the re-start state variable to o and proceeds to step 316, a state in which the NE awaits connection. If the NE receives an AIRP_Hello message, it returns an AIRP_Leader_Ack message.

[1] This is used for NE which lost connection with leader once and then reestablishes its connection with the leader.

In step 314, the Retry state, an NE returns an AIRP_Keep_Alive_Ack message to the leader if the NE receives an AIRP_Keep_Alive message within the timer period. If the keep alive timer times out, the NE sets the re-start state variable to 1 and proceeds to step 300, the starting state. If the NE receives an AIRP_Hello message, it will returns an AIRP_Hello_ack message. In step 316, the await connection state, an NE that has been elected virtual leader proceeds to step 318 if it receives TCP connection requests and has set up TCP connections with other NEs. If the leader NE does not receive a TCP connection request during the timer period, the leader NE assumes it lost the LAN connection or some other failure has occurred with the LAN and the NE will proceed to step 300, the starting step. If the NE cannot establish TCP connection with a particular node, the leader NE will drop that node from its waiting list. In such an event, the node dropped from the waiting list will re-broadcast an AIRP_Hello message. If the leader NE receives an AIRP_Hello message, it will return an AIRP_Leader_Ack message.

Figure 6:
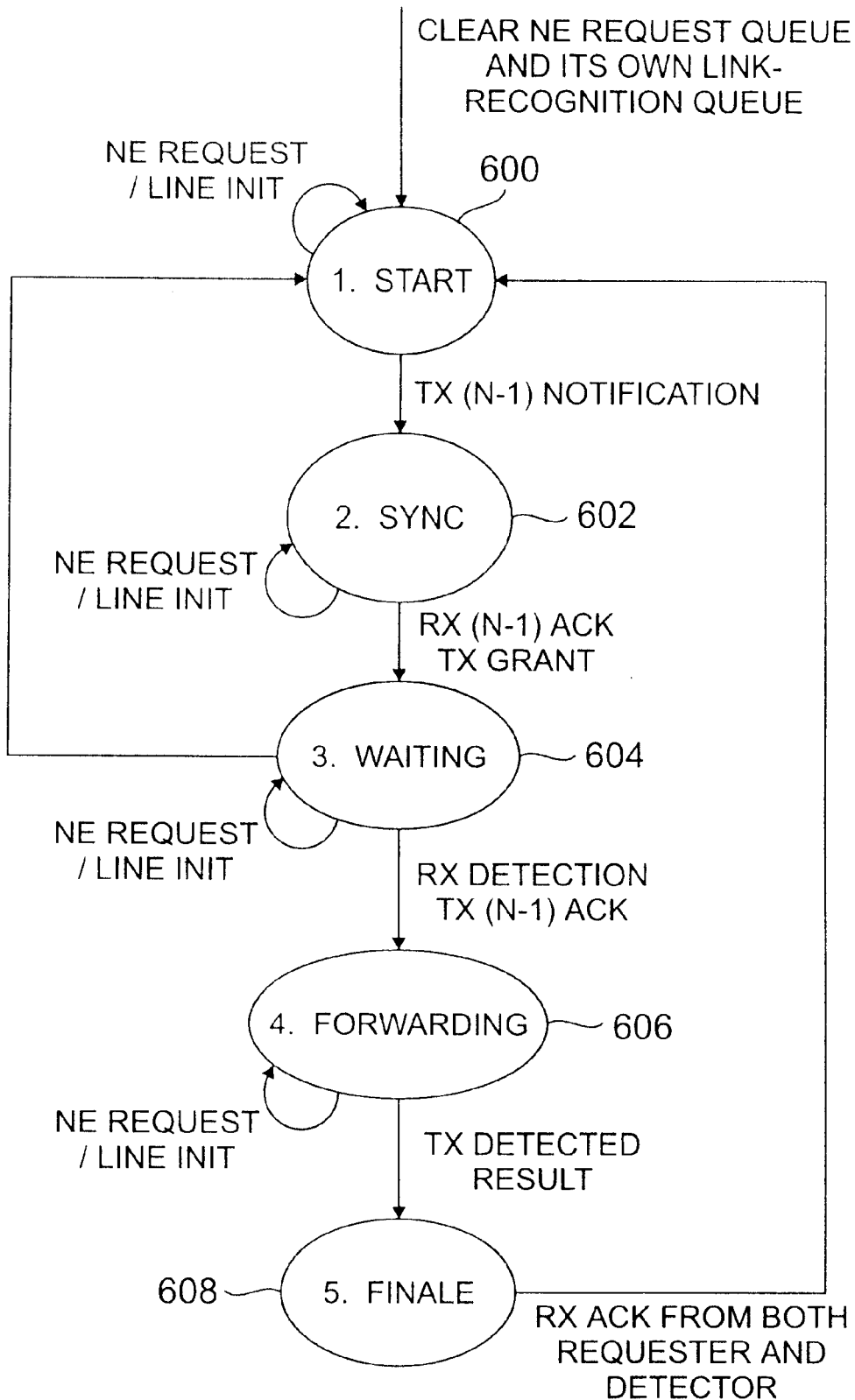
FIG. 6 is a state diagram which illustrates the operation of a leader optical NE in accordance with the principles of the present invention.

In step 318, the leader operational state, an NE will run in a virtual-leader operational state, as described in greater detail in the discussion related to FIGS. 4 and 6. In brief, if a leader NE receives an AIRP_Hello message in this state, the leader returns an AIRP_Leader_Ack message. The leader will periodically send a AIRP_Keep_Alive message to all the other connected NEs, awaits the reception of corresponding AIRP_Keep_Alive_Ack messages from the NEs. If the leader does not receive an AIRP_Keep_Alive_Ack message from a particular NE, the leader NE assumes that a failure of some sort has occurred with the NE, notifies the network management system of the failure and, and tears down the TCP connection with the failed NE. The leader NE will return to step 300, the starting state, if it receives an AIRP_Close message or if it receives no AIRP_Keep_Alive_Ack messages. Any other operational message will keep the leader in the leader operational state at step 318.

Alternatively, a network management system may determine which of the optical NEs is to be the virtual leader. The network management system may choose the first-deployed optical switching system as the virtual leader, for example, and, in such a case steps 306 and 310 of the state diagram could be eliminated, with a leader NE proceeding directly to step 312 from step 300.

The conceptual block diagram of FIG. 4 illustrates a message exchange scenario among NEs in accordance with the principles of the present invention. In this illustrative example, an optical NE leader $O_L$ coordinates the automated port binding discovery process for all the NEs in the network, including itself, $O_L$, and its associated NEs $O_1$, $O_i$, and $O_N$. In this example all the optical NEs send an AIRP_Recognition_Request message to the NE leader $O_L$, as indicated by the arrows 400. The AIRP_recognition_request message includes the physical link ID information, such as the switch name, slot number, and port number of the port associated with the request message.

Each optical NE includes a link-recognition FIFO queue and link recognition requests are placed in that queue as they are generated. A link recognition request may be passed on to the NE leader $O_L$ once the request has reached the top of the queue. After receiving link recognition requests from its associated NEs the optical leader $O_L$ places the requests in its request queue, which is, illustratively, a FIFO queue and processes the requests as they emerge from the queue. In the case of a FIFO, as in this illustrative example, $O_L$ serves the requests in the order in which they are received. Other prioritization schemes are possible.

Assuming the request from $O_1$ arrives at the NE leader $O_L$ first, and reaches the front of $O_L$'s request queue, the NE $O_L$ notifies all the connected optical NEs (other than the requesting NE $O_1$) by sending an AIRP_Recognition_Notification, in step 402. Once the SONET NEs receive the notification, they start to measure received power levels at each ingress port having an unrecognized link status, that is, a link status set to "0", in this illustrative embodiment. Then each of the connected optical NEs returns an AIRP_Recognition_Ack message to the leader $O_L$ in step 404. After the leader NE $O_L$ receives an AIRP_Ack from all the Optical Switching NEs (except $O_1$), the leader NE $O_L$ transmits an AIRP_Recognition_Grant message to NE $O_1$ in step 406. When NE $O_1$ receives the AIRP_Recognition_Grant message, NE $O_1$ starts begins transmitting the AIRP optical test signal on the link of interest (not shown).

When one of the optical NEs detects the recognition signal it reports the detection by sending an AIRP_Recognition_Detected message to the leader NE $O_L$. Assuming, in this illustrative example, that NE $O_i$ receives the recognition signal, it transmits the AIRP_Recognition_Detected message to the leader NE $O_L$ in step 408. After receiving the AIRP_Recognition_Detected message from NE $O_i$, which includes the port binding information of interest, the NE leader $O_L$ transmits an AIRP_Ack message to all the Optical Switching NEs except $O_1$ in step 410. The optical NEs cease measuring power levels at their unrecognized ports and the optical NE $O_i$ starts a timer to ensure that the power status at the port where the recognition signal was detected returns to a "no power" status. In step 412 the NE leader $O_L$ transmits an AIRP_Recognition_Detected message to the requesting NE $O_1$, including the port binding information.

After receiving the AIRP_Recognition_Detected message, the NE $O_1$ modifies its link status table, stops transmitting the test signal, and, in step 414, returns an AIRP_Ack message to the leader NE $O_L$. If O1 has other outstanding link-recognition request, it starts to send request to OL again. When the detect port's power status returns to the "no power" status, the NE $O_I$ sends an AIRP_Ack message to the NE leader $O_L$. When the leader NE has received AIRP_Ack messages from both the requester NE $O_1$ and the detector NE $O_i$, the recognition session is complete and the leader NE $O_L$ continues in an "operating as a leader" capacity, which will be described in greater below in the discussion related to FIG. 6.

The format and content of protocol data units (PDU) employed in automatic port binding discovery, that is, the new automatic interconnection recognition protocol (AIRP) in accordance with the principles of the present invention are described immediately below.

Each AIRP PDU is an AIRP header followed by AIRP messages.

The AIRP header is:

| Version | PDU length |
|---------|------------|

Version:
 Two octet unsigned integer containing the version number of the protocol. This version of the specification specifies AIRP protocol version 1.

PDU Length:
 Two octet integer specifying the total length of this PDU in octets, excluding the Version and PDU Length fields.
AIRP uses a Type-Length-Value (TLV) encoding scheme to encode much of the information carried in AIRP messages.

An AIRP TLV is encoded as 1 octet Type Field, followed by a 2 octet Length Field, followed by a variable length Value field.

| Type | Length | Value |
|---|---|---|

Type

Encodes how the Value field is to be interpreted.

Length

Specifies the length of the Value field in octets.

Value

Octet string of Length octets that encodes information to be interpreted as specified by the Type field.

In total, there are thirteen AIRP message types defined:

AIRP_Hello TLV: (IP destination address=Multicast address)

| Type = 1 | Length = 0 |
|---|---|

AIRP_Hello_Ack TLV:

| Type = 2 | Length = 0 |
|---|---|

AIRP_Leader_Ack TLV:

| Type = 3 | Length = 0 |
|---|---|

AIRP_Close TLV:

| Type = 4 | Length = 0 |
|---|---|

AIRP_Keep_Alive TLV: (IP destination address=Multicast address)

| Type = 5 | Length = 0 |
|---|---|

AIRP_Keep_Alive_Ack TLV:

| Type = 6 | Length = 0 |
|---|---|

AIRP_Reset TLV:

| Type = 7 | Length = 0 |
|---|---|

AIRP_Recognition_Request TLV:

| Type = 8 | Length = $\sum_i \text{length}(\text{value\_field}_i)$ |
|---|---|

Value field definition:

| Message sequence No.<br>Link Connection ID<br>Link Connection Optics Type |
|---|

AIRP_Recognition_Notification TLV:

| Type = 9 | Length = 0 |
|---|---|

AIRP_Recognition_Grant TLV:

| Type = 10 | Length = $\sum_i \text{length}(\text{value\_field}_i)$ |
|---|---|

Value field definition:

| Recognition_request message sequence No. |
|---|

AIRP_Recognition_Detected TLV:

| Type = 11 | Length = $\sum_i \text{length}(\text{value\_field}_i)$ |
|---|---|

Value field definition:

| Detector's IP Address<br>Recognition_request message sequence No.<br>Associated Link Connection ID Information<br>Associated Link Connection Optics Type Information |
|---|

AIRP_Ack TLV:

| Type = 12 | Length = 0 |
|---|---|

AIRP_Nak TLV:

| Type = 13 | Length = 0 |
|---|---|

The operation of a non-leader optical NE in accordance with the principles of the present invention will be described in relation to the discussion of FIG. 5. An NE will be in the the start state 500 when it is started or re-set. It is assumed that system configuration has been completely installed and the TCP connection with AIRP leader has been established. If the NE has been reset, it sends an AIRP_Reset message to the optical leader NE. Link initialization could occur at either the system starting/re-set time or at run time. To ensure that only one recognition signal will be sent to a receiving NE at one time, all the incoming link initialization requests are placed in a queue, a FIFO queue in this illustrative embodiment. Only the request at the front of the queue is passed to the leader NE. When the non-leader NE receives a message from the leader NE, it proceeds to state 502, the transmit state, if the received message is an AIRP_Recognition_Grant message. On the other hand, if the received message is an AIRP_Recognition_Notification message, the non-leader proceeds to step 508, the notified state.

If the non-Leader transitions to state 2, the transmit state 502, the non-leader NE begins transmitting the optical recognition signal from the port whose port binding information is being recognized. The NE then awaits a recognition grant message from the leader NE. If another link recognition request arrives, the request is placed at the end of requesting queue. The reception of an AIRP_Recognition_Detected message from the virtual leader causes the non-leader to stop the waiting timer and to transition to State 4, the detection state 506. However, if the waiting timer expires before the non-leader receives an AIRP_Recognition_Detected message from the virtual leader, the non-leader proceeds to state 3, the notify state 504, instead.

In state 3, the notify state 504, the non-leader NE notifies the network management system of the failure of the recognition process and the non-leader NE returns to state 1, the start 500. Any link recognition request that arrives during the notify state 504 is placed at the end of requesting queue. In state 4, the recognition detection state 506, the non-leader NE records the port binding information and ceases transmission of the detection signal. Then the NE returns an AIRP_Ack message to the virtual leader NE and the non-leader leader returns to the start state 500. Any link recognition request that arrives during the detection state 506 is placed at the end of requesting queue.

In state 5, the notified state 508, the non-leader NE starts measuring received power at all of its unrecognized ports, in this illustrative embodiment, that means those ports having a link recognition status set at "0". Additionally, the NE starts a detection-timer and returns an AIRP_Ack message to the virtual leader NE. Any link recognition request that arrives during the notified state 508 is placed at the end of requesting queue. In state 6, the polling state 510, if the non-leader NE receives an AIRP_Ack message from the virtual leader, which indicates that another NE has already detected the recognition message, the NE stops the timer and transitions to state 1, the start state 500. Otherwise the NE should, at some time, detect power at a threshold level at an unrecognized port. Once this event occurs, the non-leader NE records the port information and returns the detection result to the virtual leader. Any link recognition request that arrives during the polling state 510 is placed at the end of requesting queue.

In state 7, the detected state 512, if the non-leader NE receives an AIRP_Ack message from the virtual leader, the NE updates its link status table to record the detected port binding information, and changes the port recognition status from unrecognized to recognized (0 to 1 in this example). Additionally the NE proceeds to state 8. Any link recognition request that arrives during the detected state 512 is placed at the end of requesting queue. In state 8, the back to normal state 514, the NE returns and AIRP_Ack message to the virtual leader when it determines that the power level at the detected port has returned to an inactive level. The NE then returns to the start state 500. Any link recognition request that arrives during the detected state 512 is placed at the end of requesting queue.

The operation of a leader optical NE in accordance with the principles of the present invention will be described in relation to the discussion of FIG. 6. An NE will be in the start state 600 when it is started or re-set. It is assumed that system configuration has been completely installed and the TCP connection with the other NEs has been establishedLink initialization could occur at either the system starting/re-set time or at run time. To ensure that only one recognition signal will be sent to a receiving NE at one time, all the incoming link initialization requests are placed in a queue, a FIFO queue in this illustrative embodiment. Only the request at the front of the queue is passed to the leader NE. The virtual leader NE clears both its NE request queue and its own link recognition request queue. Meanwhile, it checks its state variable: my_request_status, and, if it is 0, the request at the top of its link-recognition queue is placed at the end of NE request queue, and my_request_status is set to 1. If the current value of my_request_status is 1, the link recognition request is placed at the end of the leader NE's own link-recognition queue. Any incoming recognition request from another NE is placed at the end of NE request queue. Any reset message from another NE will cause the virtual leader to remove from the leader NE's request queue all of the outstanding requests from the NE that sent the reset message.

Once the leader NE's request queue is non-empty, the request at the front of the request queue is served by the virtual leader. The leader NE sends an AIRP_Recognition_Notification message to all the NEs except the requesting NE. If the virtual leader is not the requester NE, the leader also sends AIRP_Recognition_Notification message to itself. A total of N−1 such messages are sent in a system of N NEs. Once the leader NE receives AIRP_Recognition_Notification message, the server starts power measurement on all ports that are unrecognized (illustratively, with port recognition status set to "0"). The leader then sends an AIRP_Ack message to itself. If the leader NE detects the recognition power signal, it will also send AIRP_Recognition_Detected message to itself. After transmitting the AIRP_Recognition_Notification messages, the leader proceeds to state 2, the synchronization state 602.

In state 2 602, when the leader NE receives (N−1) AIRP_Ack messages, it sends an AIRP_Recognition_Grant message to the selected requester, that is, to the requester whose request has reached the front of the queue The leader starts a waiting timer and proceeds to state 3, the waiting state 604. If the selected requester is the virtual leader itself, once it receives an AIRP_Recognition_Grant message, it begins transmitting the recognition signal from the port at which port binding information is being sought. In state 2 602, if the leader NE receives another link recognition request from itself, the request is placed at the end of the leader NE's link-recognition queue. If a request from another NE arrives in this state, the request is placed at the end of the NE request queue. An AIRP_Reset message from another NE will cause the virtual leader to remove all the sending NE's outstanding recognition requests from the NE request queue.

In State 3, the waiting state 604, if the timer times out and no detection message was received before time-out, the virtual leader returns to State 1, the starting state 600, where it proceeds to process any other requests in the request queue. If the timer does not expire, when the leader NE receives an AIRP_Recognition_Detected message, it sends an AIRP_Ack message to all N−1 NEs other than the selected requester. If the virtual leader receives an AIRP_Ack message before a detection signal is detected, the leader NE stops the detection process. If the leader NE itself uncovers the recognition information before receiving an AIRP_Ack message the leader will stop the detection process when it receives an AIRP_Ack message and changes the port recognition status of the detected port: from unrecognized to recognized (0 to 1). The leader will also monitor the detected port to detect a power level shift that indicates the recognition signal is no longer being received there. When it determines that the recognition signal is no longer being received at the port, the leader NE sends an AIRP_Ack message to itself. During this state, if another link recognition request of its own arrives, the request is placed at the end of the leader's own link-recognition queue, If a request from another NE arrives, the request is placed at the end of the leader NE's NE request queue. A reset message from another NE will cause the virtual leader to remove all of the sending NE's outstanding requests from the NE request queue.

The leader NE proceeds to state 4, the forwarding state 606 after sending the AIRP_Ack message and, in this state, the leader NE forwards the detected information to the selected requester. During this state, if another link recognition request of its own arrives, the request is placed at the end of the leader's own link-recognition queue. If a request from another NE arrives, the request is placed at the end of the leader NE's NE request queue. A reset message from another NE will cause the virtual leader to remove all of the sending NE's outstanding requests from the NE request queue. If the virtual leader is itself the selected requester, it will use the received detection message to update its link status table and will check its own link-recognition queue to see whether it is empty. If its link recognition queue is non-empty, the leader moves the top request of its link recognition queue to the end of the NE request queue. Otherwise, the leader NE sets my_request_status back to 0, stops the transmission of the recognition signal at the recognized port and sends an AIRP_Ack message to the virtual leader. From state 4, the leader NE proceeds to state 5 608.

In State 5, the finale state 608, once the virtual leader receives AIRP_Ack messages from both the selected requester and detector, the leader returns to state 1, the start state 600. During this state, if another link recognition request of its own arrives, the request is placed at the end of the leader's own link-recognition queue. If a request from another NE arrives, the request is placed at the end of the leader NE's NE request queue. A reset message from another NE will cause the virtual leader to remove all of the sending NE's outstanding requests from the NE request queue.

Figure 7:
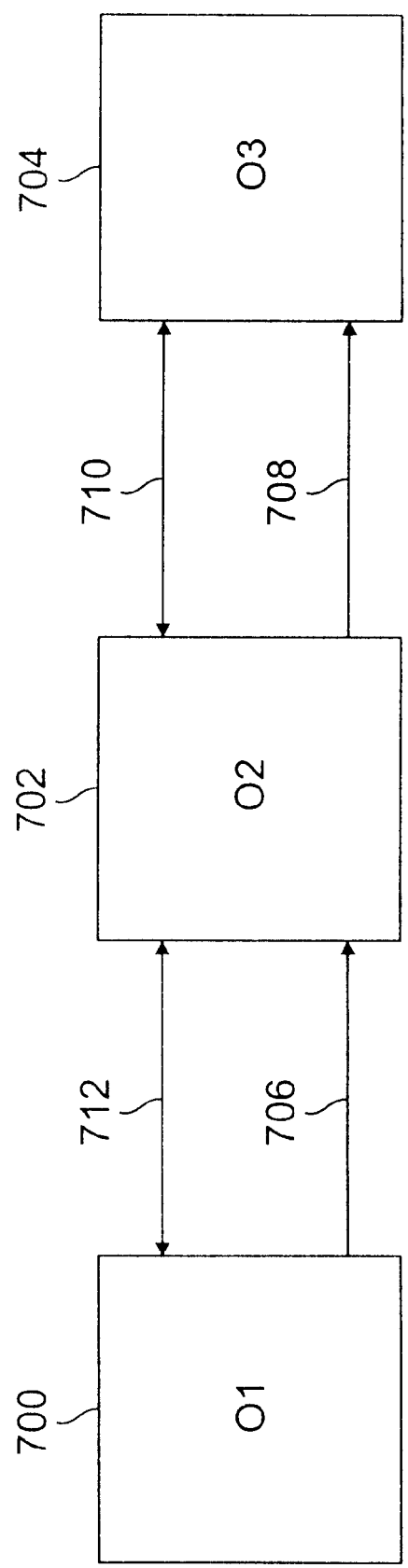
FIG. 7 is a block diagram which illustrates the operation of the automatic interconnection recognition protocol in detecting the fault point within an optical network.

As described in the discussion related to FIG. 7, the automatic interconnection recognition protocol may be used to localize faults during system runtime in an optical telecommunications system. Turning now to FIG. 7, three optical NEs O1 700, O2 702, and O3 704 are connected by unidirectional optical links 706 and 708. Additionally, the NEs are linked through bi-directional links 710 and 712 which represent an out of band control path, such as a LAN as previously described.

Assuming at system run-time, that NE O3 704 detects a failure in the optical data path from O1 to O3. NE O3 704 could signal back to NE O2 702 using an AIRP message on the control path 710. If the NE O2 does not respond, the implication is that the NE O2 has failed and the NE O3 704 can report the failure to the network management system (not shown). If the NE O2 702 is healthy it responds to the AIRP fault-handling signal from the NE O3 704 and the NE O2 702 tears down the cross-connect which used to be part of O1->O3 light path. The NE O2 702 also changes the corresponding output link's link status table working status entry from 1 to 0 (its link recognition status should be 1). The NE O2 702 then sets up a cross-connect between the testing device which generates the link recognition signal and the corresponding output port. Additionally, the NE O2 702 alerts the NE O3 704 to monitor its ingress port for a power level which would indicate the reception of the recognition test signal, as previously described If the NE O3 704 detects the recognition signal at its ingress port, which indicates that the link between NEs O2 and O3 is operational, the NE O2 702 repeats the procedure for the link between itself and NE O1 700 O2 to determine whether the NE O1 700 or the link between NEs O1 700 and O2 702 is problematic. Based on this procedure, fault may be isolated and reported to the network management system. Additionally, because the procedure only operates on a link with its link recognition status set at "1" and its link working status set at "0", there is no interference between this testing procedure and the AIRP recognition procedure. Consequently, run-time fault localization and run-time link recognition can occur simultaneously.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An optical network element comprising;
a port for connection to another optical network element;
means for determining whether the optical network element is a leader or non-leader network element; and
an out of band channel for communication with one or more optical network elements, the out of band channel configured to transmit a request for port identification and to receive a request for port identification, the port further configured to transmit an optical port detection signal in cooperation with the request for port identification transmitted through the out of band channel.

2. The optical network element of claim 1 wherein the out of band channel is configured to transmit requests for port identification to another the optical leader network element.

3. The optical network element of claim 2 wherein the out of band channel is configured to transmit the request for port identification to an optical leader network element.

4. The optical network element of claim 1 further comprising a port identification request queue wherein the network element is configured to place a request for port identification in the queue.

5. The optical network element of claim 4 wherein the network element is configured to accept port identification requests from other network element s and place them in the queue if the network element is a leader network element.

6. The optical network element of claim 5 wherein the network element is configured to place port identification requests it generates into the queue.

7. The optical network element of claim 5 wherein the optical network element is responsive to the detection of the port detection signal by storing the port binding information.

8. The optical network element of claim 5 wherein the optical network element is responsive to the detection of the port detection signal by transmitting the port binding information to an associated optical leader network element.

9. The system of claim 8 wherein the out of band channel is configured to transmit requests for port identification to another the optical leader network element.

10. The system of claim 9 wherein the network element is configured to accept port identification requests from other network element s and place them in the queue if the network element is a leader network element.

11. The system of claim 8 further comprising a port identification request queue wherein the network element is configured to place a request for port identification in the queue.

12. The system of claim 11 wherein the network element is configured to place port identification requests it generates into the queue.

13. The system of claim 8 wherein the port detection signal is an optical test signal.

14. The system of claim 8 wherein the optical network element comprises a plurality of optical ports and is responsive to the reception of a port detection signal by polling a plurality of unrecognized ports to detect which of the ports receives the port detection signal.

15. The system of claim 11 wherein the optical network element is responsive to the detection of the port detection signal by storing the port binding information.

16. The system element of claim 11 wherein the optical network element is responsive to the detection of the port detection signal by transmitting the port binding information to an associated optical leader network element.

17. The optical network element of claim 1 wherein the port detection signal is an optical test signal.

18. The optical network element of claim 1 wherein the optical network element comprises a plurality of optical ports and is responsive to the reception of a port detection signal by polling a plurality of unrecognized ports to detect which of the ports receives the port detection signal.

19. An optical telecommunications system comprising:

a plurality optical network elements, each of the network elements including:
- a port for connection to another optical network element;
- means for determining whether the optical network element is a leader or non-leader network element; and
- an out of band channel for communication with one or more optical network elements, the out of band channel configured to transmit a request for port identification and to receive a request for port identifications the port further configured to transmit an optical port detection signal in cooperation with the request for port identification transmitted through the out of band channel.

20. The system of claim 19 wherein the out of band channel is configured to transmit the request for port identification to an optical leader network element.

21. In a telecommunications system that includes a plurality of optical network elements, a method for a network element to automatically determine port binding information comprising the steps of;
- A) the optical network elements electing a leader;
- B) an optical network element transmitting a request for port identification information through an out of band channel to the optical leader network element;
- C) the leader network element transmitting the request to a second optical network element, and
- D) transmitting a port detection signal to the connected network element through the optical link associated with the port for which port identification information was requested.

22. The method of claim 21 wherein the port detection signal transmitted in step D) is an optical signal.

23. The method of claim 22 further comprising the step of:
- E) a network element receiving a port detection request and monitoring its ports to detect the reception of a port detection signal in response.

24. The method of claim 23 wherein step E) comprises the step of:
- E1) the network element polling all its unrecognized ingress ports to detect a threshold optical power level the port which receives the port detection signal.

25. The method of claim 24 further comprising the step of:
- F) the network element storing the port binding information in response to the detection of the port detection signal.

26. The method of claim 25 further comprising the step of:
- G) the network element transmitting the port binding information to the network element leader in response to the detection of the port detection signal.

27. The method of claim 22 wherein step C) comprises the step of:
- C1) transmitting the detection signal to all network elements in the system but the network element that requested the port binding information.

* * * * *